United States Patent [19]

Decker et al.

[11] Patent Number: 5,795,927
[45] Date of Patent: Aug. 18, 1998

[54] COLOR STABLE WRINKLE FINISH EPOXY POWDER COATING

[75] Inventors: Owen H. Decker, Wyomissing; David A. Mountz, Douglasville; Charles P. Tarnoski, Sinking Sprink, all of Pa.

[73] Assignee: Morton International, Inc., Chicago, Ill.

[21] Appl. No.: 775,976

[22] Filed: Jan. 3, 1997

Related U.S. Application Data

[63] Continuation-in-part of Ser. No. 650,081, May 17, 1996, Pat. No. 5,688,878.

[51] Int. Cl.$^6$ .................... C08L 63/00; C08F 283/00
[52] U.S. Cl. .................... 523/401; 525/533; 525/534; 525/934
[58] Field of Search .................... 525/533, 534, 525/934; 523/401

[56] References Cited

U.S. PATENT DOCUMENTS

| | | | |
|---|---|---|---|
| 2,918,491 | 12/1959 | Radue | 260/474 |
| 3,458,566 | 7/1969 | Yakimik | 260/521 |
| 3,468,942 | 9/1969 | Blum | 260/520 |
| 3,557,198 | 1/1971 | Yakimik | 427/521 |
| 3,639,928 | 2/1972 | Bentley et al. | 260/47 |
| 3,954,898 | 5/1976 | Hirota et al. | 260/837 |
| 3,996,175 | 12/1976 | Schreiber et al. | 260/28 |
| 4,094,721 | 6/1978 | Sturm et al. | 156/309 |
| 4,264,758 | 4/1981 | Waddill | 524/100 |
| 4,271,277 | 6/1981 | Golownia | 525/351 |
| 4,341,819 | 7/1982 | Schreffler et al. | 528/195 |
| 4,419,477 | 12/1983 | Saeki et al. | 525/290 |
| 4,504,615 | 3/1985 | Mills | 524/291 |
| 4,528,127 | 7/1985 | Holderegger et al. | 525/530 |
| 4,556,693 | 12/1985 | Corcoran et al. | 525/162 |
| 4,599,401 | 7/1986 | Koleske | 528/408 |
| 4,677,170 | 6/1987 | Monnier et al. | 525/539 |
| 4,701,378 | 10/1987 | Bagga et al. | 428/414 |
| 4,703,101 | 10/1987 | Singer et al. | 525/438 |
| 4,751,112 | 6/1988 | Smith, Jr. et al. | 427/388.3 |
| 4,757,117 | 7/1988 | Moss | 525/483 |
| 4,788,255 | 11/1988 | Pettit, Jr. et al. | 525/131 |
| 4,997,951 | 3/1991 | Bagga | 548/352 |
| 5,021,513 | 6/1991 | Bagga | 525/325.8 |
| 5,026,777 | 6/1991 | Jalbert et al. | 525/316 |
| 5,115,025 | 5/1992 | Koleske et al. | 525/162 |
| 5,115,083 | 5/1992 | Piedrahita et al. | 528/230 |
| 5,124,405 | 6/1992 | Erickson | 525/92 |
| 5,182,337 | 1/1993 | Pettit, Jr. et al. | 525/176 |
| 5,212,263 | 5/1993 | Schreffler | 525/533 |
| 5,212,777 | 5/1993 | Schreffler | 525/533 |
| 5,248,400 | 9/1993 | Franks et al. | 525/113 |
| 5,256,713 | 10/1993 | Jacobs, III et al. | 524/99 |
| 5,380,804 | 1/1995 | Lees et al. | 525/327.3 |
| 5,447,751 | 9/1995 | Horinka et al. | 427/257 |
| 5,453,295 | 9/1995 | Sammel et al. | 427/195 |
| 5,536,785 | 7/1996 | Foukes et al. | 525/176 |
| 5,543,464 | 8/1996 | Decker et al. | 525/176 |
| 5,573,828 | 11/1996 | Horinka et al. | 428/152 |

FOREIGN PATENT DOCUMENTS

| | | |
|---|---|---|
| A0195660 | 9/1986 | European Pat. Off. |
| 57-159862 | 10/1982 | Japan. |
| 03-208844 | 9/1991 | Japan. |
| 5271577 | 10/1993 | Japan. |

OTHER PUBLICATIONS

CA Selects: Coatings, Inks, & Related Products. Issue 22, 1993, p. 7 119: 182962w.

Research Disclosure: Jul. 1993 No. 351 457–459.

Modern Paint and Coatings, Oct. 1980, pp. 88–92 (Formulation Techniques Using Triflic Acid Salts).

Journal of Paint Technology, vol. 44, No. 565, Feb. 1972 (Powder Coating: Why – How – When).

*Primary Examiner*—Randy Gulakowski
*Attorney, Agent, or Firm*—Nick C. Kottis; Charles N. Lovell; Gerald K. White

[57] ABSTRACT

Powdered coating compositions and methods for obtaining improved wrinkled finishes with epoxy powder coatings are provided which utilize a color stabilizer effective to avoid an excessive red color shift upon cure of the composition.

7 Claims, No Drawings

COLOR STABLE WRINKLE FINISH EPOXY POWDER COATING

CROSS REFERENCE TO RELATED APPLICATION

This application is a continuation-in-part of application, U.S. Ser. No. 08/650,081, filed on May 17, 1996, now U.S. Pat. No. 5,688,878. The co-pending parent application is hereby incorporated by reference herein and is made a part hereof, including but not limited to those portions which specifically appear hereinafter.

BACKGROUND OF THE INVENTION

This invention relates generally to epoxy powder coatings and, more particularly, to improved epoxy powder coatings that yield wrinkle finishes.

Wrinkle finishes are desired in many applications and are commonly applied to office equipment such as word processing system components, typewriters, staplers, filing cabinets, and the like. In addition to being aesthetically pleasing, these finishes can provide certain utilitarian advantages in that they are of relatively low gloss (i.e., not shiny), they minimize the appearance of scratches, and they can hide the presence of substrate surface defects even when the coating has been applied on such a surface in the form of a thin film.

Epoxy resin-based powder coatings having wrinkle finishes are taught in U.S. Pat. No. 4,341,819, the teachings of which are incorporated herein by reference. The coating compositions disclosed therein include compositions which are dry, free flowing powders that may be used in fusion coating processes. As used herein, "fusion coating processes" generally refer to those coating processes in which coating powders are distributed over a substrate and heat, such as supplied from the substrate or an external source, fuses the powder particles into a substantially continuous film. Examples of fusion coating processes include fluidized bed, electrostatic spraying, hot flocking (with or without electrostatic spray), and cloud chambers, for example. When coating powders are based on heat-curing resins, such as in the case of typical epoxy powder coatings that yield wrinkle finishes, sufficient heat in excess of the amount of heat required to fuse the powders will be needed in order to properly cure the coating and fully develop the physical and chemical properties of the coating. Normally, such curing is a function of cure conditions, e.g., cure time and temperature.

Experience has shown that some coating compositions, upon cure, may exhibit undesired discoloration. Normally, such discoloration is in the nature of discoloration in the yellow-brown color spectrum and is encountered when a coating is treated at conditions of either, or both, higher than desired cure temperature or longer than desired cure time. For example, a coating which cures when treated at 375° F. for 15 minutes may exhibit significant discoloration, e.g., "yellowing," when treated at one or more of the following alternative conditions:

a) 375° F. for 60 minutes;

b) 450° F. for 15 minutes; and c) 450° F. for 60 minutes.

With the cure of wrinkle finish epoxy coatings, a new and different type of discoloration has been found to sometimes occur. Specifically, such coatings may experience discoloration which, rather than being of a yellowish color, is in the red color spectrum. Further, such "reddish" discoloration may occur at the normal and intended cure conditions of the wrinkle finish epoxy coating. For example, a wrinkle finish epoxy coatings which cure when treated at 375° F. for 10 minutes and at 350° F. for 15 minutes, respectively, may experience such reddish discoloration even though each such coating is only treated at 375° F. for 10 minutes and at 350° F. for 15 minutes, respectively. That is, such discoloration may be realized even though the coating has not been subjected to conditions of either, or both, higher than desired cure temperature or longer than desired cure time.

While such reddish discoloration is normally less pronounced when the wrinkle finish epoxy coating is treated at temperatures of less than about 350° F., the time required to effect cure at such lower temperatures can become excessively prolonged (e.g., 30 minutes or more) and such lower temperature treatment of the coating may not effect a complete cure of the coating.

In addition, the amount, degree or magnitude of such red color shift realized upon cure of wrinkle finish epoxy coatings has been observed to be of a variable nature.

As a result of this tendency of epoxy wrinkle coating compositions to redden when such a coating composition is cured, the production of light color wrinkle coatings has been fraught with difficulty. In practice, the formation of consistent white and relatively light color pastel wrinkle coatings have been virtually unattainable. Further, compositions to provide dark pastel and even some light gray color wrinkle coatings typically require reformulations wherein various masking pigments are added in an effort to compensate for the red shift realized upon cure of the composition.

As identified above, epoxy resin-based powder coatings having wrinkle finishes are taught in U.S. Pat. No. 4,341,819. The coating powder disclosed therein achieves a wrinkle finish by means of a special curing agent, methylenedisalicylic acid (MDSA), acting on the epoxy groups of the resin.

Commonly assigned U.S. Pat. No. 5,212,263 discloses an epoxy powder coating composition which includes an epoxy resin, MDSA as a curing agent, and an adduct of an imidazole and a Bisphenol A epoxy resin as a cure agent or catalyst. Such a composition is disclosed as providing a finish having a more predictable texture.

Commonly assigned U.S. Pat. No. 5,447,751 is directed to providing a predictable method for forming weatherable wrinkle finish coatings of various colors. This patent discloses the providing of a wrinkle finish with a powder coating of a hydroxyl-functional resin having a functionality greater than 2, an aminoplast resin as a curing agent, and cyclamic acid as a catalyst.

Unfortunately, epoxy powder coatings with wrinkle finishes which utilize conventionally available MDSA as a curing agent can, under certain circumstances, result or produce wrinkle finishes with less than desired properties or characteristics. For example, in addition to the discoloration discussed above, some such epoxy powder coatings may provide wrinkle finishes which lack consistency in appearance, e.g., the resulting wrinkle patterns may be relatively poorly defined.

Thus, there has been a demand and a need for an epoxy powder coating which provides a wrinkle pattern finish having improved consistency and depth, as compared to the common wrinkle finishes provided by coatings which utilize conventionally available MDSA as a curing agent.

The above-identified, commonly assigned patent application, U.S. Ser. No. 08/650,081, filed on May 17, 1996, describes and discloses a powdered coating composition adapted to provide a wrinkled finish which overcomes at least some of the problems normally associated with wrinkle finish epoxy powder coatings which utilize conventionally available MDSA as a curing agent. More specifically, this application discloses a wrinkle finish coating composition which, in addition to an epoxy resin and a catalyst, includes a curing agent other than methylenedisalicylic acid, 3,5-bis|(3-carboxy-4-hydroxyphenyl)methyl|-2-hydroxybenzoic acid, 5-|3-carboxy-2-hydroxyphenyl)methyl|-3-|(3-carboxy-4-hydroxyphenyl)methyl|-2-hydroxybenzoic acid, 3-|3-carboxy-2-hydroxyphenyl)methyl|-5-|(3-carboxy-4-hydroxyphenyl)methyl|-2-hydroxybenzoic acid, 3,5-bis|(3-carboxy-2-hydroxyphenyl)methyl|-2-hydroxybenzoic acid, and which has a structure in general accordance with the formula

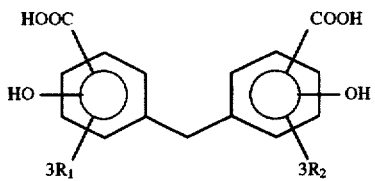

wherein each $R_1$ is selected from the group consisting of H, $C_1$–$C_{20}$ alkyl groups, $C_6$–$C_{10}$ aryl groups and aryl substituted methylene groups and wherein each $R_2$ is selected from the group consisting of H, $C_1$–$C_{20}$ alkyl groups, $C_6$–$C_{10}$ aryl groups and aryl substituted methylene groups.

While such powder coating compositions can be effective in overcoming at least some of the problems, including reducing the amount or magnitude of the discoloration realized or associated with the cure of such coating compositions which utilize conventionally available MDSA as a curing agent, at least some such compositions may still experience an undesired amount of red shift discoloration. Thus, further wrinkle finish powder coating composition improvements and, in particular, improvements directed towards wrinkle finish powder coatings which avoid discoloration during cure, are desired.

Thus, there is a demand and a need for a wrinkle finish epoxy powder coating which does not exhibit undesired discoloration upon being cured.

SUMMARY OF THE INVENTION

A general object of the invention is to provide an improved epoxy powder coating that yields a wrinkle finish.

A more specific objective of the invention is to provide a wrinkle finish powder coating composition that avoids undesired discoloration upon being cured.

A still more specific objective of the invention is to overcome one or more of the problems described above.

The general object of the invention can be attained, at least in part, through a powdered coating composition adapted to provide a wrinkled finish and containing an epoxy resin, a curing agent and a catalyst. The composition also includes a color stabilizer effective to avoid a red color shift $\Delta a$ of more than about 1.5 upon cure of the composition, as compared to the same composition which has been fused but not cured.

The prior art fails to provide color stable wrinkle finish epoxy coatings, particularly color stable wrinkle finish epoxy coatings which utilize MDSA or an analog thereof as a curing agent. More specifically, the prior art fails to provide wrinkle finish epoxy coatings which consistently avoid the above-described red color shift. The uncertain occurrence and magnitude of the red color shift realized upon the cure of wrinkle finish epoxy coatings has largely precluded the development of a white wrinkle finish epoxy coating and has necessitated that many light or pastel color wrinkle finish epoxy coatings be color adjusted on a "lot by lot" basis. As a result, the prior art has failed to provide wrinkle finish epoxy coatings which can routinely be expected to produce a cured, light color, e.g., white, wrinkle finish epoxy coating.

The invention further comprehends other particular powdered coating compositions adapted to provide a wrinkled finish. In one particular form such powdered coating composition is adapted to provide a light color coating and includes an epoxy resin, a catalyst, a curing agent selected from the group consisting of methylenedisalicylic acid and other than methylenedisalicylic acid while having a structure in general accordance with the formula

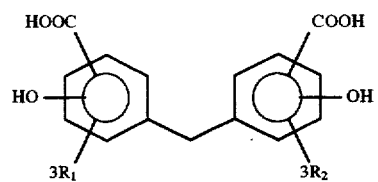

wherein each $R_1$ is selected from the group consisting of H, $C_1$–$C_{20}$ alkyl groups, $C_6$–$C_{10}$ aryl groups and aryl substituted methylene groups and wherein each $R_2$ is selected from the group consisting of H, $C_1$–$C_{20}$ alkyl groups, $C_6$–$C_{10}$ aryl groups and aryl substituted methylene groups, and a color stabilizer comprising at least one compound selected from the group consisting of hindered phenolic compounds, divalent sulfur derivatives, trivalent phosphorous compounds and metal chelators. The color stabilizer is effective to avoid a red color shift $\Delta a$ of more than about 1.5 upon cure of the composition, as compared to the same composition which has been fused but not cured.

The invention still further comprehends a method for obtaining a light color wrinkled finish on a substrate surface. The method includes the step of applying onto the substrate surface a powdered coating composition which includes an epoxy resin, a curing agent, a catalyst and a color stabilizer effective to avoid a red color shift $\Delta a$ of more than about 1.5 upon cure of the composition, as compared to the same composition which has been fused but not cured.

As used herein, references to "phr" are to be understood to refer to its usual sense as meaning parts per hundred parts of the resin, by weight.

References to hindered phenolic compounds are to be understood to refer to compounds having the common structural feature that both ortho positions of the phenol are occupied by bulky groups and the para position is also occupied.

References to an application of a composition having been "fused" but not cured are to be understood to refer to an applied composition which has been sufficiently heated to permit the powder coating to melt and coalesce to form a film. Further, such a "fused" composition is one in which the occurrence of a significant amount of cross linking reactions by the composition and the exhibition of a wrinkle finish pattern have been avoided. In practice, the occurrence of a significant amount of cross linking reactions by such a composition is typically evidenced by development of: 1) a wrinkle pattern, 2) impact resistance, and 3) chemical resistance. Typical state of the art wrinkle finish epoxy powder coatings will "fuse," e.g., melt and flow conveniently, when heated at 280° F. for about 5 minutes and can be exposed to such 280° F. heating for 30 minutes or longer without evidencing the occurrence of cure. e.g.. significant cross linking or exhibition of a wrinkle finish.

References to an application of a composition having been "cured" are to be understood to refer to an applied composition which has been sufficiently heated to permit the powder coating to melt and coalesce into a film and. in addition. the coating forms 1) a wrinkle finish pattern, 2) has an impact resistance of at least about 20 inch-lbs. and 3) has sufficient chemical resistance to withstand at least 50 double rubs of methyl ethyl ketone without the occurrence of a rub through of a 2.5–4.0 mil film.

References to "light" color coatings are to be understood to refer to coatings with a lightness of L=50 or more and preferably a lightness of L=75 or more. on the CIELAB color scale of 0–100. where 0=black and 100=white.

Other objects and advantages will be apparent to those skilled in the art from the following detailed description taken in conjunction with the appended claims.

DETAILED DESCRIPTION OF THE INVENTION

The present invention provides wrinkle finish epoxy powder coatings which avoid undesired discoloration upon being cured.

The epoxy powder coating compositions of the invention typically include an epoxy resin, a catalyst, a curing agent and a color stabilizer, while the method for obtaining a wrinkled finish on a substrate surface involves applying such an epoxy powder coating composition of the invention onto a substrate surface.

The epoxy resins used in the invention include Bisphenol A type epoxies with epoxide equivalent weights of between about 600 and about 1100, or mixtures of such epoxies. Preferably, the major portion, i.e., over about 50% of the epoxy resin, is an epoxy resin with an equivalent weight between about 600 and 750.

The catalysts used in the invention are typically of the blocked Lewis acid type and are typically utilized at a level of about 0.3 phr to about 1.5 phr, preferably at a level of about 0.5 phr to about 1 phr.

As disclosed in commonly assigned U.S. Pat. No. 4,341,819, a useful curing agent for such wrinkle finish epoxy coating powder formulations is methylenedisalicylic acid (MDSA).

As disclosed in the above-identified related application, U.S. Ser. No. 08/650,081, filed on May 17, 1996, the curing agent for such wrinkle finish epoxy coating powder formulations can be other than methylenedisalicylic acid (MDSA), 3,5-bis[(3-carboxy-4-hydroxyphenyl)methyl]-2-hydroxybenzoic acid, 5-[3-carboxy-2-hydroxyphenyl) methyl]-3-[(3-carboxy-4-hydroxyphenyl)methyl]-2-hydroxybenzoic acid, 3-[3-carboxy-2-hydroxyphenyl) methyl]-5-[(3-carboxy-4-hydroxyphenyl)methyl]-2-hydroxybenzoic acid, 3,5-bis[(3-carboxy-2-hydroxyphenyl) methyl]-2-hydroxybenzoic acid, and have a structure in general accordance with the formula

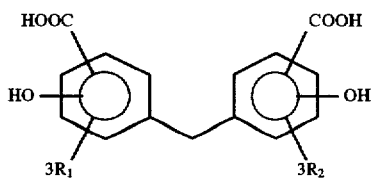

[1]

wherein each $R_1$ is selected from the group consisting of H. $C_1$–$C_{20}$ alkyl groups. $C_6$–$C_{10}$ aryl groups and aryl substituted methylene groups and wherein each $R_2$ is selected from the group consisting of H. $C_1$–$C_{20}$ alkyl groups. $C_6$–$C_{10}$ aryl groups and aryl substituted methylene groups.

In one preferred form. this curing agent has the general formula |1| wherein each $R_1$ is H.

In another preferred form, the curing agent has the structure

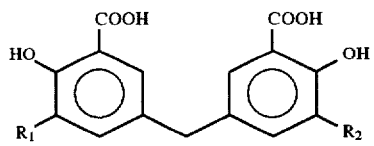

[2]

wherein $R_1$ is selected from the group consisting of H. $C_1$–$C_{20}$ alkyl groups. $C_6$–$C_{10}$ aryl groups and aryl substituted methylene groups and wherein $R_2$ is selected from the group consisting of H. $C_1$–$C_{20}$ alkyl groups. $C_6$–$C_{10}$ aryl groups and aryl substituted methylene groups.

Specific preferred forms of such curing agents include those wherein $R_1$ is $CH_3$ and $R_2$ is either H or $CH_3$.

The coating compositions of the invention typically contain the curing agent at a level between about 8 phr and about 25 phr, preferably the curing agent is included at a level between about 14 phr and about 20 phr and, in one preferred embodiment, the curing agent is included at a level of about 16 phr.

As will be shown in the examples below, the coating compositions of the invention additionally comprise a color stabilizer effective to avoid a red color shift Δa of more than about 1.5 and, preferably of more than about 1, upon cure of the composition as compared to the same composition which has been fused but not cured.

Color stabilizers useful to prevent the red discoloration of epoxy wrinkle compositions include the following categories or types: hindered phenolic compounds, divalent sulfur derivatives, trivalent phosphorous compounds and metal chelators.

Hindered phenol compounds have the common structural feature that both ortho positions of the phenol are occupied by bulky groups and the para position is also occupied. Useful hindered phenolic color stabilizers include, but are not limited to the following materials (all sold by Ciba Additives Inc.):

IRGANOX 1010: 3,5-bis(1,1-Dimethylethyl)-4-hydroxybenzenepropanoic acid, 2,2-bis[[3-[3,5-bis(1,1-dimethylethyl)-4-hydroxyphenyl]-1-oxopropoxy]methyl]-1,3-propanediyl ester;

IRGANOX 1076: Octadecyl 3,5-bis(1,1-dimethylethyl)-4-hydroxybenzenepropanoate;

IRGANOX 3125: 3,5-Di-tert-butyl-4-hydroxcinnamic acid, triester with 1,3,5-tris(2-hydroxyethyl)-S-triazine-2,4,6,(1H,3H,5H)-trione;

IRGANOX 3114: Tris-(3,5-di-tert-butyl-4-hydroxybenzyl) isocyanurate;

IRGANOX 259: Hexamethylene bis(3,5-di-tert-butyl-4-hydroxyhydrocinnamate;

IRGANOX 1330: 1,3,5-trimethyl-2,4-6-tris(3,5-di-tert-butyl-4-hydroxybenzyl)benzene;

IRGANOX 245: Triethyleneglycol bis[3-(3'-tert-butyl-4'-hydroxy-5'-methylphenyl)propionate]; and IRGANOX 1098: N,N'hexamethylene bis (3,5-di-tert-butyl-4-hydroxyhydrocinnamamide).

Divalent sulfur derivatives have the common structural feature that two substituent groups are attached to sulfur. Useful divalent sulfur color stabilizers include, but are not limited to: Dilaurylthiodipropionate; Disterylthiodipropionate and Thiodiethylene bis(3,5-di-tert-butyl-4-hydroxy) hydrocinnamate (sold by Ciba Additives Inc. as IRGANOX 1035).

Trivalent phosporous compounds have the common structural feature that three substituent groups are attached to a phosphorous atom. Useful trivalent phosphorous color stabilizers include, but are not limited to: Tris(nonylphenyl) phosphite; Tetrakis(2,4-di-tert-butylpheyl)-4,4'-biphenylenediphosphonite; Calcium bis[monoethyl(3,5-di-tert-butyl-4-hydroxybenzyl)phosphonate (sold by Ciba Additives Inc. as IRGANOX 1425); and Tris(2,4-di-tert-butylphenyl)phosphite (sold by Ciba Additives Inc. as IRGAFOS 168).

Metal chelators have the common structural feature that they provide two or more atoms with a free pair of electrons positioned such that they can coordinate with a single metal center. Examples of suitable metal chelators include, but are not limited to: Oxalyl bis(benzylidenehydrazide); N,N'-bis (3,5-di-tert-butyl-4-hydroxyhydrocinnamoyl)hydrazine; 2,2'-oxamindobisethyl(3,5-di-tert-butyl-4-hydroxyhydrocinnamate and 1,2-bis(3,5-di-tert-butyl-4-hydroxycinnamoyl)hydrazide (sold by Ciba Additives Inc. as IRGANOX MD 1024).

These color stabilizers can be used alone or in combination with another color stabilizer of the same or different category or type. In one preferred embodiment of the invention, the color stabilizer used in the epoxy wrinkle compositions include one or more hindered phenolic compounds and one or more additional color stabilizer additives selected from the group consisting of divalent sulfur derivatives, trivalent phosphorous compounds and metal chelators. For example, in particular embodiments the color stabilizer comprises, consists, or consists essentially of either a hindered phenolic compound (such as IRGANOX 3125, for example) and a divalent sulfur derivative (such as disterylthiodipropionate, for example) or a hindered phenolic compound (such as IRGANOX 3125, for example) and a metal chelator (such as IRGANOX MD 1024, for example).

Typically, these additives (i.e., hindered phenolic compounds, divalent sulfur derivatives, trivalent phosphorous compounds and metal chelators) are effective color stabilizers when present in the coating composition at a level between about 0.1 and about 5 phr, preferably at a level between about 0.25 and about 3 phr.

The precise mechanism by which the present invention prevents undesired color shift of a cured, wrinkle finish powder coating is not presently completely understood. For example, while additives such as the above-identified hindered phenols are frequently classified as antioxidants, it has been found that the benefits attendant the practice of the invention are not realized when other common antioxidant or additives are attempted to be used as wrinkle finish powder coating composition color stabilizer materials in accordance with the invention. For example, the incorporation of antioxidant or additives such as hindered amines, such as sold by Ciba Additives Inc. under the trademark TINUVIN 622 LD (a polymer of dimethylsuccinate and 4-hydroxy-2,2,6,6-tetramethylpiperidineethanol), has been found to depress the formation of the desired and sought wrinkle pattern. (See Comparative Example 2, below.) Also, it has been found that the use of aromatic amine additives is generally precluded as such additive materials are typically strongly colored.

The coating powder compositions of the invention may be clear, i.e., non-pigment-loaded, or may contain up to about 200 phr (though generally 120 phr or less) of filler and/or pigment, relative to the weight of the total of the epoxy-functional resin. In addition, the coating composition may contain conventional additives, e.g., antioxidants, light stabilizers, flow modifiers, co-stabilizers, etc., generally at a level of about 10 phr or less.

Coating powders in accordance with the present invention can be formed in a conventional manner. For example, the components of the coating composition can be combined and blended for up to about 15 minutes in order to form a well-blended mixture. The blended materials are then extruded, e.g., at 110° C. in a single screw or twin screw extruder, ground and screened to obtain a powder of appropriate particle size. Average particle size is typically 20–80 microns. Scalping at 60 mesh is typical to remove coarse particles. Typically, about 10% by weight of the particles are less than 10 microns. The amount of material retained on a 325 mesh is typically between about 30 and 50 wt. %. The powder is then applied in a conventional manner, e.g., electrostatically, to a substrate. The substrate is heated at the time of application and/or subsequently so that the coating particles melt, form a continuous film, and cure.

The present invention is described in further detail in connection with the following examples which illustrate various aspects involved in the practice of the invention. It is to be understood that all changes that come within the spirit of the invention are desired to be protected and thus the invention is not to be construed as limited by these examples.

EXAMPLES

Example 1 (Ex. 1)

In accordance with the invention, a white powder coating composition with a color stabilizer added to prevent red-shift during cure was prepared and applied to a substrate surface.

The components listed under Ex. 1 in Table 1 were compounded, chilled, chipped, ground and sieved through a 60 mesh screen in the usual manner to prepare a white coating powder. This powder was electrostatically sprayed onto the surface of first and second 0.032 inch thick, mild steel, "Q" panels (hereinafter referred to as panel (A) and panel (B), respectively) to form a coating.

The following procedures were then utilized to measure or evaluate the following characteristics or parameters: 1) magnitude of the color shift, 2) 60° gloss, 3) impact resistance, and 4) chemical resistance:

1) Color Shift

The degree of color shift towards red was measured as follows:

(1) Panel (A) was placed in a 280° F. oven for 5 minutes. Under these conditions, the coating melted but did not cure or undergo a red shift and was present as a smooth, glossy film.

(2) Panel (B) was placed in a 350° F. oven for 15 minutes. Under these conditions the coating cured forming a wrinkled, low gloss film.

(3) The color of the coating on each panel, (A) and (B), was measured. The difference on the red-green axis was calculated and found to be a red shift of $\Delta a=1.11$. This value is recorded in Table 2.

2) 60° Gloss

The magnitude of the 60° gloss (i.e., the fractional measure of reflected to incident light at a 60° angle to the plane of the coating, expressed as a percentage) for the smooth film coating on Panel (A) and the wrinkled coating on Panel (B), respectively, were determined utilizing a BYK Gardner micro-TRI-gloss brand gloss meter. The values are reported in Table 2.

3) Impact Resistance

The direct impact resistances of the smooth film coating on Panel (A) and the wrinkled coating on Panel (B), respectively, were determined by impacting each of the coated panels with a ½ inch diameter spherical tup at different selected impact energies. Each of the values quoted in Table 2 is the highest impact energy (inch-lbs.) withstood by the respective coated panel without cracks visually appearing in the coating.

4) Chemical Resistance

The chemical resistance of the smooth film coating on Panel (A) and the wrinkled coating on Panel (B), respectively, were measured as follows:

a cotton swab, soaked with methyl ethyl ketone, was firmly pressed against the coated panel surface at a 45° angle and rubbed back and forth for a total of fifty cycles at a rate of about two cycles a second.

The chemical resistance of a coating was evaluated as follows:

| LEVEL | DESCRIPTION |
|-------|-------------|
| 1 | rub through, substrate exposed |
| 2 | heavy rub off, but substrate not exposed |
| 3 | moderate rub off |
| 4 | slight rub off or softening |
| 5 | no effect |

The values are reported in Table 2.

The significance of the coating properties, parameters and characteristics reported in Table 2 are generally as follows:

Red Shift—The Red Shift is a color difference between a coating in its cured and fused states expressed as a unitless number on the CIELAB color scale. At the white end of the scale where these measurements were taken, differences of as little as 0.1 are discernible to the human eye.

60° Gloss—The 60° gloss is a standard measure of coating smoothness. It was included as a numerical means of demonstrating the presence of a wrinkle pattern. At glosses below 10, gloss differences of as little as 0.5 are easily seen by the human eye.

Impact Resistance—In epoxy wrinkle coatings impact resistance develops as chemical crosslinking occurs during the cure reaction. It is included as evidence of whether the cure reactions had occurred.

Chemical Resistance—Resistance to attack by solvents is another property of epoxy wrinkle coatings that increases during cure. It is included as evidence of whether the cure reactions had occurred.

Appearance—An appearance evaluation was included as a broad subjective measure of wrinkle quality. It is used to distinguish between cured (wrinkled) and fused (smooth) coatings, and to illustrate the harmful effect of certain additives, such as TINUVIN 622 LD.

Comparative Example 1 (CE 1)

In this comparative example, a state of the art powder coating composition, not containing a color stabilizer in accordance with the invention, was prepared, applied to substrate surfaces and the red color shift was measured.

A powder coating composition using the components listed in Table 1 under CE 1 was prepared in the usual manner and coatings thereof were prepared following the procedure outlined in Example 1, above. As in Example 1, the fused coating formed a smooth and glossy film, whereas the cured coating formed a wrinkle, low gloss film.

The color shift on cure was measured as outlined in Example 1 and found to be a red shift of $\Delta a=2.74$. This value is recorded in Table 2. Note that the red shift is significantly larger for this powder coating composition which did not contain a color stabilizer than the red shift observed in Example 1, utilizing a composition containing a color stabilizer in accordance with the invention.

Table 2 also reports the 60° gloss, the direct impact resistance, the chemical resistance and appearance of the coatings of the respective Panel (A) and Panel (B) of the composition of this comparative example.

Comparative Example 2 (CE 2)

This comparative example discloses a white powder coating composition containing the hindered amine additive, TINUVIN 622 LD.

A powder coating composition using the components listed in Table 1 under CE 2 was prepared in the usual manner and coatings thereof were prepared following the procedure outlined in Example 1 above. In contrast to Example 1, above, the fused coating had a pebbly texture and reduced gloss.

The color shift was measured as outlined in Example 1 and found to be a red shift of $\Delta a=0.77$. This value is recorded in Table 2. Table 2 also reports the 60° gloss, the direct impact resistance, the chemical resistance and appearance of the coatings of the respective Panel (A) and Panel (B) of the composition of this example.

This comparative example illustrates that while certain additives may be effective in reducing the color shift during cure, their addition can have side effects which are deleterious to the formation of the wrinkle pattern or to other properties of the coating. Thus, while the cured coating in Comparative Example 2 showed less red shift than the cured coating in Comparative Example 1, the cured coating of Comparative Example 2 failed to develop a proper wrinkle pattern, as further evidenced by, the 60° gloss of 12.3 and the reduced chemical resistance.

Example 2 (Ex. 2)

This example discloses a white powder coating composition containing a color stabilizer in accordance with the invention and methylenebis(3-methylsalicylic acid), an analog of MDSA commonly referred to as "M3MA," as the curing agent. The composition is listed in Table 1 under Ex. 2. The powder coating composition was prepared in the usual manner and coatings thereof were prepared following the procedure outlined in Example 1 above.

As above, the fused coating was smooth and glossy, while the cured coating was wrinkled and had a low gloss.

The color shift on cure was measured as outlined in Example 1 and found to be a red shift of $\Delta a=0.62$. This value is recorded in Table 2.

Table 2 also reports the 60° gloss, the direct impact resistance, the chemical resistance and appearance of the coatings of the respective Panel (A) and Panel (B) of the composition of this example.

Comparative Example 3 (CE 3)

This example illustrates a state of the art powder coating composition containing methylenebis(3-methylsalicylic acid), as the curing agent, but not containing a color stabilizer, as described herein. This composition is listed in Table 1 under CE 3.

A coating powder of this composition was prepared in the usual manner and coatings thereof were prepared following the procedure outlined in Example 1 above.

As above, the fused coating was smooth and glossy, while the cured coating was wrinkled and had a low gloss.

The color shift on cure was measured as outlined in Example 1 and found to be a red shift of $\Delta a=2.42$. This value is recorded in Table 2. Note in Table 2 that the red shift is larger (larger $\Delta a$) than observed in Example 2, which contains a color stabilizer.

Table 2 also reports the 60° gloss, the direct impact resistance, the chemical resistance and appearance of the coatings of the respective Panel (A) and Panel (B) of the composition of this comparative example.

Example 3 (Ex. 3)

In this example, a white powder coating composition similar to the coating composition of Example 1 was prepared but now using, the color stabilizer IRGAFOS 168 rather than IRGANOX 3125, and applied to a substrate surface following the procedure outlined in Example 1 above. The composition is listed in Table 1 under Ex. 3.

As above, the fused coating was smooth and glossy, while the cured coating was wrinkled and had a low gloss.

The color shift on cure was measured as outlined in Example 1 and found to be a red shift of $\Delta a=1.43$. This value is recorded in Table 2.

Table 2 also reports the 60° gloss, the direct impact resistance, the chemical resistance and appearance of the coatings of the respective Panel (A) and Panel (B) of the composition of this example.

Example 4 (Ex. 4)

This example discloses a white powder coating composition containing the components listed in Table 1 under Ex. 4 was prepared in the usual manner and coatings thereof were prepared following the procedure outlined in Example 1 above.

As above, the fused coating was smooth and glossy, while the cured coating was wrinkled and had a low gloss.

The color shift was measured as outlined in Example 1 and found to be a red shift of $\Delta a=0.64$. This value is recorded in Table 2. Table 2 also reports the 60° gloss, the direct impact resistance, the chemical resistance and appearance of the coatings of the respective Panel (A) and Panel (B) of the composition of this example.

Example 5 (Ex. 5)

This example discloses a white powder coating composition containing a blend of color stabilizer additives, i.e., a hindered phenolic compound (IRGANOX 3125) and a divalent sulfur derivative (disterylthiodipropionate), in accordance with the invention.

A powder coating composition using the components listed in Table 1 under Ex. 5 was prepared in the usual manner and coatings thereof were prepared following the procedure outlined in Example 1 above. As above, the fused coating was smooth and glossy, while the cured coating was wrinkled and had a low gloss.

The color shift was measured as outlined in Example 1 and found to be a red shift of $\Delta a=0.57$. This value is recorded in Table 2. Table 2 also reports the 60° gloss, the direct impact resistance, the chemical resistance and appearance of the coatings of the respective Panel (A) and Panel (B) of the composition of this example.

This example illustrates that color stabilizers in accordance with the invention can comprise a combination or mixture of such color stabilizer additives.

Example 6 (Ex. 6)

This example discloses a white powder coating composition containing another combination of color stabilizer additives, i.e., a hindered phenolic compound (IRGANOX 3125) and a metal chelator compound (IRGANOX MD 1024), in accordance with the invention.

A powder coating composition using the components listed in Table 1 under Ex. 6 was prepared in the usual manner and coatings thereof were prepared following the procedure outlined in Example 1 above. As above, the fused coating was smooth and glossy, while the cured coating was wrinkled and had a low gloss.

The color shift was measured as outlined in Example 1 and found to be a red shift of $\Delta a=0.87$. This value is recorded in Table 2. Table 2 also reports the 60° gloss, the direct impact resistance, the chemical resistance and appearance of the coatings of the respective Panel (A) and Panel (B) of the composition of this example.

This example further illustrates that combinations of color stabilizer additives can work to reduce the color shift which occurs during cure.

TABLE 1

| Component | COMPOSITIONS | | | | | | | | |
|---|---|---|---|---|---|---|---|---|---|
| | Ex. 1 | CE 1 | CE 2 | Ex. 2 | CE 3 | Ex. 3 | Ex. 4 | Ex. 5 | Ex. 6 |
| GT-7013 Epoxy Resin | 100 | 100 | 100 | 100 | 100 | 100 | 100 | 100 | 100 |
| MDSA Curing Agent | 14 | 14 | 14 | — | — | 14 | 14 | 14 | 14 |
| M3MA Curing Agent | — | — | — | 18 | 18 | — | — | — | — |
| R-902 TiO$_2$ Pigment | 60 | 60 | 60 | 60 | 60 | 60 | 60 | 60 | 60 |
| Barium Sulfate Filler | 4.5 | 4.5 | 4.5 | 4.5 | 4.5 | 4.5 | 4.5 | 4.5 | 4.5 |
| RESIFLOW P-67 Acrylic Flow Modifier | 1.5 | 1.5 | 1.5 | 1.5 | 1.5 | 1.5 | 1.5 | 1.5 | 1.5 |
| BCl$_3$:NH$_2$Et Catalyst | 0.5 | 0.5 | 0.5 | 0.5 | 0.5 | 0.5 | 0.5 | 0.5 | 0.5 |
| Arctic Blue #3 Pigment | — | — | — | 0.05 | 0.05 | — | — | — | — |
| IRGANOX 3125 | 1.0 | — | — | 1.0 | — | — | 2.0 | 1.0 | 1.0 |

TABLE 1-continued

| | COMPOSITIONS | | | | | | | | |
|---|---|---|---|---|---|---|---|---|---|
| Component | Ex. 1 | CE 1 | CE 2 | Ex. 2 | CE 3 | Ex. 3 | Ex. 4 | Ex. 5 | Ex. 6 |
| IRGAFOS 168 | — | — | — | — | — | 1.0 | — | — | — |
| Disterylthiodipropionate | — | — | — | — | — | — | — | 0.5 | — |
| IRGANOX MD 1024 | — | — | — | — | — | — | — | — | 0.5 |
| TINUVIN 622 LD | — | — | 1.0 | — | — | — | — | — | — |

TABLE 2

| | RESULTS | | | | | | | |
|---|---|---|---|---|---|---|---|---|
| | Red Shift | 60° Gloss[2] | | Impact Res.[3] | | Chem. Res.[4] | | Appearance[5] |
| TRIAL | $\Delta a^1$ | F | C | F | C | F | C | F | C |
| Ex. 1 | 1.11 | 69.1 | 4.1 | fail | 40 | 1 | 4 | S | W |
| CE 1 | 2.74 | 78.0 | 4.2 | fail | 20 | 1 | 4 | S | W |
| CE 2 | 0.77 | 16 | 12.3 | fail | 20 | 1 | 2 | PT | PT |
| Ex. 2 | 0.62 | 99 | 4.7 | fail | 40 | 1 | 4 | S | W |
| CE 3 | 2.42 | 99 | 4.7 | fail | 40 | 1 | 4 | S | W |
| Ex. 3 | 1.43 | 81 | 6.6 | fail | 40 | 1 | 4 | S | W |
| Ex. 4 | 0.64 | 94 | 4.6 | fail | 40 | 1 | 4 | S | W |
| Ex. 5 | 0.57 | 98 | 3.6 | fail | 20 | 1 | 3 | S | W |
| Ex. 6 | 0.87 | 100 | 4.3 | fail | 40 | 1 | 4 | S | W | where:
F = fused
C = cured
1 = CIELAB scale color units
2 = percent of incident light reflected
3 = direct impact resistance, where fail = obvious cracks visible in impacted coating, and numerical values are in units of inch–lbs.
4 = chemical resistance, where:
1 = rub through, substrate exposed
2 = heavy rub off, but substrate not exposed
3 = moderate rub off
4 = slight rub off or softening
5 = no effect
5 = appearance, where:
S = smooth
W = wrinkle
PT = pebbly texture

DISCUSSION OF RESULTS

Taken together, Examples 1 and 2 with Comparative Examples 1 and 3 show the improvement in color stability provided by a hindered phenolic color stabilizer. As identified above, Comparative Example 2 illustrates that although the addition of a hindered amine additive such as TINUVIN 622 LD can improve color stability, such an additive can have side effects which are deleterious to the formation of the wrinkle pattern or to other properties of the coating.

Example 3 shows the improvement in color stability provided by a typical trivalent phosphorous compound. Example 4, in comparison to Example 1, shows the enhanced color stability realized with an increased concentration of a hindered phenolic stabilizer. Example 5, in comparison to Example 1, shows the enhanced color stability realized through the use of a color stabilizer comprising a combination or blend of divalent sulfur and hindered phenolic stabilizers. Example 6 shows the enhanced color stability realized when metal chelators are combined in use with hindered phenolic compounds.

Thus, it is to be appreciated that through the practice of the subject invention, an improved wrinkle finish-providing epoxy powder coating can be produced. The invention provides a wrinkle finish powder coating composition that avoids undesired discoloration upon being cured. As will be appreciated, the avoidance of undesired discoloration permits the production of white and light color wrinkle finish powder coatings in a more consistent manner without requiring the sometimes expensive and time-consuming reformulation of the pigment additives used in the powder coating composition.

The invention illustratively disclosed herein suitably may be practiced in the absence of any element, part, step, component, or ingredient which is not specifically disclosed herein.

The foregoing detailed description is given for clearness of understanding only, and no unnecessary limitations are to be understood therefrom, as modifications within the scope of the invention will be obvious to those skilled in the art.

What is claimed is:

1. A powdered coating composition providing a light color wrinkled finish, said composition comprising:

an epoxy resin, a catalyst, a curing agent selected from the group consisting of methylenedisalicylic acid and other than methylenedisalicylic acid having a structure in general accordance with the formula

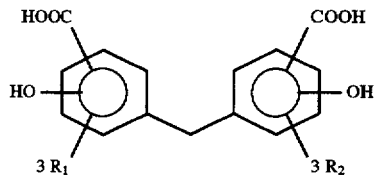

wherein each $R_1$ is selected from the group consisting of H, $C_1$–$C_{20}$ alkyl groups, $C_6$–$C_{10}$ aryl groups and aryl substituted methylene groups and wherein each $R_2$ is selected from the group consisting of H, $C_1$–$C_{20}$ alkyl groups, $C_6$–$C_{10}$ aryl groups and aryl substituted methylene groups, and a color stabilizer comprising at least one compound selected from the group consisting of hindered phenolic compounds, divalent sulfur compounds, trivalent phosphorous compounds and metal chelators, said color stabilizer present at a level between about 0.1 and about 5 phr and effective to avoid a red color shift $\Delta a$ of more than about 1.5 upon cure of said composition, as compared to the same composition which has been fused but not cured.

2. The powdered coating composition of claim 1 wherein said color stabilizer is effective to avoid a red color shift Δa of more than about 1 upon cure of said composition, as compared to the same composition which has been fused but not cured.

3. The powdered coating composition of claim 1 wherein said color stabilizer comprises a hindered phenol.

4. The powdered coating composition of claim 3 wherein said color stabilizer additionally comprises a compound selected from the group consisting of: divalent sulfur compounds, trivalent phosphorous compounds and metal chelators.

5. The powdered coating composition of claim 1 wherein said curing agent comprises methylenedisalicylic acid.

6. The powdered coating composition of claim 1 wherein said curing agent comprises a compound other than methylenedisalicylic acid, and has a structure in general accordance with the formula

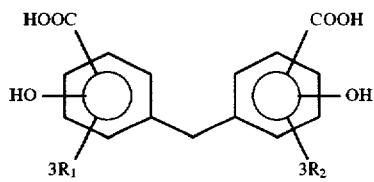

wherein each $R_1$ is selected from the group consisting of H, $C_1$–$C_{20}$ alkyl groups, $C_6$–$C_{10}$ aryl groups and aryl substituted methylene groups and wherein each $R_2$ is selected from the group consisting of H, $C_1$–$C_{20}$ alkyl groups, $C_6$–$C_{10}$ aryl groups and aryl substituted methylene groups.

7. The powdered coating composition of claim 6 wherein the curing agent comprises methylenebis(3-methylsalicylic acid).

* * * * *